US012659903B2

(12) United States Patent
Liu

(10) Patent No.: US 12,659,903 B2
(45) Date of Patent: Jun. 16, 2026

(54) WIRELESS COMMUNICATION METHOD AND DEVICE TO FACILITATE INTERWORKING OF A USER EQUIPMENT (UE) BETWEEN A NON-PUBLIC NETWORK (NPN) AND MULTIPLE PUBLIC LAND MOBILE NETWORKS (PLMN)

(71) Applicant: InterDigital Patent Holdings, Inc., Wilmington, DE (US)

(72) Inventor: Jianhua Liu, Dongguan (CN)

(73) Assignee: InterDigital Patent Holdings, Inc., Wilmington, DE (US)

( * ) Notice: Subject to any disclaimer, the term of this patent is extended or adjusted under 35 U.S.C. 154(b) by 608 days.

(21) Appl. No.: 18/089,445

(22) Filed: Dec. 27, 2022

(65) Prior Publication Data

US 2023/0132185 A1    Apr. 27, 2023

Related U.S. Application Data

(63) Continuation of application No. PCT/CN2020/106554, filed on Aug. 3, 2020.

(51) Int. Cl.
| | |
|---|---|
| *H04W 60/00* | (2009.01) |
| *H04W 28/02* | (2009.01) |
| *H04W 76/30* | (2018.01) |

(52) U.S. Cl.
CPC ....... *H04W 60/00* (2013.01); *H04W 28/0268* (2013.01); *H04W 76/30* (2018.02)

(58) Field of Classification Search
CPC .. H04W 60/00; H04W 76/30; H04W 28/0268
(Continued)

(56) References Cited

U.S. PATENT DOCUMENTS

2019/0313238 A1* 10/2019 Palanigounder ........ H04W 8/20
2020/0236682 A1    7/2020 Quan et al.
(Continued)

FOREIGN PATENT DOCUMENTS

CN    110636506 A    12/2019
CN    111182543 A    5/2020
(Continued)

OTHER PUBLICATIONS

The First Office Action from corresponding Chinese Application No. 202080101934.8 dated Apr. 29, 2024, 23 pages.
(Continued)

*Primary Examiner* — Rafael Pérez-Gutiérrez
(74) *Attorney, Agent, or Firm* — Volpe Koenig

(57) ABSTRACT

A wireless communication method and device are provided. The method includes: receiving, by a terminal device, first indication information indicating that the terminal device and a first Public Land Mobile Network (PLMN) are capable of interworking with each other. With the first indication information, the terminal device and the first PLMN can interwork with each other. That is, with the first indication information, the terminal device can access an IMS in the first PLMN. It is possible to not only enable the terminal device in an NPN to be connected to the IMS, but also avoid separate deployment of the IMS in the NPN, such that the network deployment cost and system complexity can be reduced.

17 Claims, 5 Drawing Sheets

(58) Field of Classification Search
USPC .... 455/435.2, 435.1, 432.1, 422.1, 418, 423
See application file for complete search history.

(56)                     References Cited

U.S. PATENT DOCUMENTS

| 2022/0264435 A1* | 8/2022 | Yang | H04W 48/08 |
|---|---|---|---|
| 2022/0408352 A1* | 12/2022 | Fujishiro | H04W 16/32 |
| 2023/0189191 A1* | 6/2023 | Wang | H04W 36/00226 |
| | | | 370/329 |
| 2023/0319621 A1* | 10/2023 | Gan | H04L 65/1069 |
| | | | 370/229 |
| 2023/0397059 A1* | 12/2023 | Zhang | H04W 36/0072 |

FOREIGN PATENT DOCUMENTS

| CN | 111182591 A | 5/2020 |
|---|---|---|
| CN | 111183680 A | 5/2020 |
| CN | 111194095 A | 5/2020 |
| CN | 111263424 A | 6/2020 |
| CN | 111277420 A | 6/2020 |
| CN | 111447675 A | 7/2020 |
| CN | 111448816 A | 7/2020 |
| CN | 111465011 A | 7/2020 |
| WO | 2011035454 A1 | 3/2011 |
| WO | 2015132633 A1 | 9/2015 |
| WO | 2019136644 A1 | 7/2019 |

OTHER PUBLICATIONS

NTT DOCOMO et al., "Unified Access Control for IMS registration related signalling", 3GPP TSG-CT WG1 Meeting #120,C1-196509, Sep. 30, 2019, 25 pages.
International Search Report and Written Opinion dated Apr. 25, 2021 in International Application No. PCT/CN2020/106554. English translation attached.
ERICSSON. "Introducing Support for Non-Public Networks", 3GPP TSG-SA WG2 Meeting #130 S2-1900122, Jan. 25, 2019 (Jan. 25, 2019), sections 3-6.
Ericsson."Solution to support service continuity between two networks and paging from both networks", Sa WG2 Meeting #S2-139E, S2-2004350, May 22, 2020(2020-05-22), p. 3.
China Mobile. "KI #3: New solution: PLMN assisted IMS voice service for SNPN", SA WG2 Meeting #S2-139E, S2-2004362, May 22, 2020(May 22, 2020), p. 2.

* cited by examiner

210

A terminal device receives first indication information indicating that the terminal device and a first PLMN are capable of interworking with each other.

S211

600

NPN Access Network Device

610

Communication Unit

700

Core Network Device

710

Communication Unit

800

Comm. Device

820 Memory    Processor 810

Transceiver 830

900

Chip

930    Processor 910

Memory 920    940

WIRELESS COMMUNICATION METHOD AND DEVICE TO FACILITATE INTERWORKING OF A USER EQUIPMENT (UE) BETWEEN A NON-PUBLIC NETWORK (NPN) AND MULTIPLE PUBLIC LAND MOBILE NETWORKS (PLMN)

CROSS-REFERENCE TO RELATED APPLICATIONS

This application is a continuation of International Application No. PCT/CN2020/106554 filed on Aug. 3, 2020, the entire disclosure of which is incorporated herein by reference.

TECHNICAL FIELD

The embodiments of the present disclosure relate to communication technology, and more particularly, to a wireless communication method and device.

BACKGROUND

Currently, ordinary end users receive data services via public networks, but in some scenarios, such as office scenarios, home scenarios, and factories, in order to have more effective and safer management, there will be local users or managers deploying local networks or private networks, i.e., Non-Public Network (NPN). The public network may be a Public Land Mobile Network (PLMN).

Network elements in the NPN can exist independently of the PLMN, that is, the NPN has its own network elements such as Policy Control Function (PCF), Session Management Function (SMF), Access and Mobility Management Function (AMF), Unified Data Management (UDM) and the like, and has its own root key, security algorithm, subscription information, policy information, etc. to achieve isolation from the PLMN.

However, in the NPN, some services, e.g., Internet Protocol Multimedia Service System (IMS) service, may not be supported.

SUMMARY

A wireless communication method and device are provided. By accessing an IMS in a PLMN, it is possible to not only enable a terminal device in an NPN to be connected to the IMS, but also avoid separate deployment of the IMS in the NPN, such that the network deployment cost and system complexity can be reduced.

In a first aspect, a wireless communication method is provided. The method includes: receiving, by a terminal device, first indication information indicating that the terminal device and a first Public Land Mobile Network (PLMN) are capable of interworking with each other.

In a second aspect, a wireless communication method is provided. The method includes: receiving, by a Non-Public Network (NPN) access network device, first indication information indicating that a terminal device and a first Public Land Mobile Network (PLMN) are capable of interworking with each other.

In a third aspect, a wireless communication method is provided. The method includes: transmitting, by a Non-Public Network (NPN) Access and Mobility Management Function (AMF), first indication information to an NPN access network device, the first indication information indicating that a terminal device and a first Public Land Mobile Network (PLMN) are capable of interworking with each other.

In a fourth aspect, a wireless communication method is provided. The method includes: receiving, by a second Session Management Function (SMF), third indication information transmitted by a Non-Public Network (NPN) access network device, the third indication information indicating triggering of a process of redirection to a first Public Land Mobile Network (PLMN), the second SMF being in an SMF in a second PLMN, the first PLMN and the second PLMN being same or different.

In a fifth aspect, a terminal device is provided. The terminal device is configured to perform the method according to the above first aspect or any implementation thereof. In particular, the terminal device includes one or more functional modules configured to perform the method according to the above first aspect or any implementation thereof.

In a sixth aspect, an NPN access network device is provided. The NPN access network device is configured to perform the method according to the above second aspect or any implementation thereof. In particular, the NPN access network device includes one or more functional modules configured to perform the method according to the above second aspect or any implementation thereof.

In a seventh aspect, a core network device is provided. The core network device is configured to perform the method according to the above third or fourth aspect or any implementation thereof. In particular, the core network device includes one or more functional modules configured to perform the method according to the above third or fourth aspect or any implementation thereof.

In an eighth aspect, a terminal device is provided. The terminal device includes a processor and a memory. The memory is configured to store a computer program, and the processor is configured to invoke and execute the computer program stored in the memory to perform the method according to the above first aspect or any implementation thereof.

In a ninth aspect, an NPN access network device is provided. The NPN access network device includes a processor and a memory. The memory is configured to store a computer program, and the processor is configured to invoke and execute the computer program stored in the memory to perform the method according to the above second aspect or any implementation thereof.

In a tenth aspect, a core network device is provided. The core network device includes a processor and a memory. The memory is configured to store a computer program, and the processor is configured to invoke and execute the computer program stored in the memory to perform the method according to the above third or fourth aspect or any implementation thereof.

In an eleventh aspect, a chip is provided. The chip is configured to perform the method according to any of the above first to fourth aspects or any implementation thereof. In particular, the chip includes a processor configured to invoke and execute a computer program from a memory, to enable a device provided with the chip to perform the method according to any of the above first to fourth aspects or any implementation thereof.

In a twelfth aspect, a computer-readable storage medium is provided. The computer-readable storage medium is configured to store a computer program that enables a computer to perform the method according to any of the above first to fourth aspects or any implementation thereof.

In a thirteenth aspect, a computer program product is provided. The computer program product includes computer program instructions that cause a computer to perform the method according to any of the above first to fourth aspects or any implementation thereof.

In a fourteenth aspect, a computer program is provided. The computer program, when executed on a computer, causes the computer to perform the method according to any of the above first to fourth aspects or any implementation thereof.

Based on the above technical solutions, with the first indication information, the terminal device and the first PLMN can interwork with each other. That is, with the first indication information, the terminal device can access an IMS in the first PLMN. It is possible to not only enable the terminal device in an NPN to be connected to the IMS, but also avoid separate deployment of the IMS in the NPN, such that the network deployment cost and system complexity can be reduced.

DESCRIPTION OF EMBODIMENTS

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

Figures 1, 2, 3:
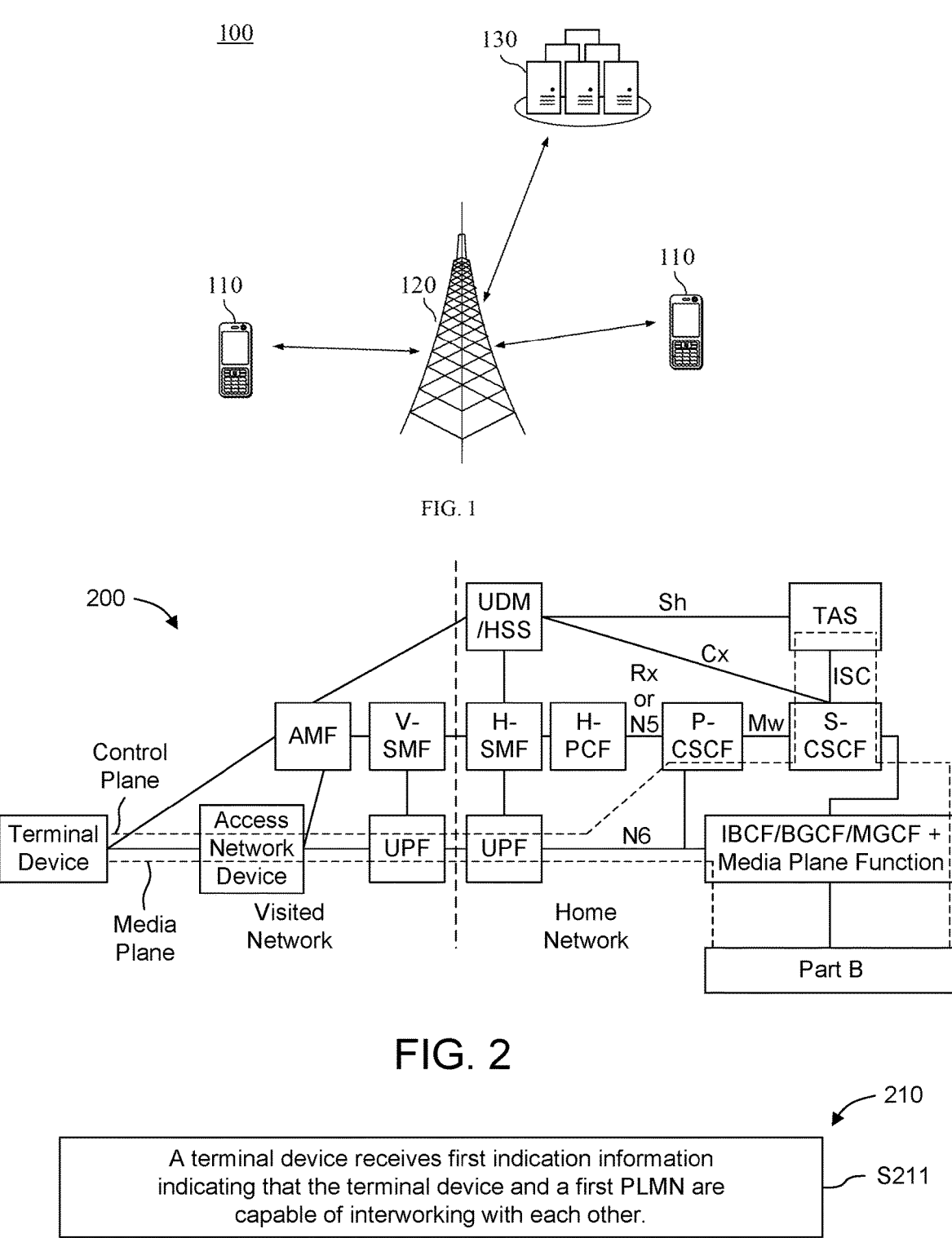
FIG. 1 is an example of a scenario in which the present disclosure can be applied.
FIG. 2 is a schematic diagram showing a structure of a system framework according to an embodiment of the present disclosure.
FIGS. 3 to 8 are schematic flowcharts each illustrating a wireless communication method according to an embodiment of the present disclosure.

FIG. 1 is a schematic diagram showing an application scenario of an embodiment of the present disclosure.

As shown in FIG. 1, a communication system 100 may include terminal devices 110 and a network device 120. The network device 120 may communicate with the terminal devices 110 via an air interface. Multi-service transmission is supported between the terminal devices 110 and the network device 120.

It can be appreciated that the embodiment of the present disclosure is described with reference to the communication system 100 for illustration only, but the embodiment of the present disclosure is not limited to this. The solutions according to the embodiments of the present disclosure can be applied to various communication systems, including for example: Long Term Evolution (LTE) system, LTE Time Division Duplex (TDD), Universal Mobile Telecommunication System (UMTS), the $5^{th}$ Generation (5G) communication system (or referred to as New Radio, or NR, communication system), or future communication systems.

In the communication system 100 shown in FIG. 1, the network device 120 may be an access network device that communicates with the terminal device 110. The access network device may provide communication coverage for a particular geographic area, and may communicate with the terminal devices 110 (e.g., UEs) located within the coverage.

The network device 120 may be a base station such as Evolutional Node (eNB or eNodeB) in an LTE system, a Next Generation Radio Access Network (NG RAN) device, a base station such as gNB in the NR system, or a radio controller in a Cloud Radio Access Network (CRAN), or the network device 120 may be a relay station, an access point, a vehicle-mounted device, a wearable device, a hub, a switch, a bridge, a router or a network device in a future evolved Public Land Mobile Network (PLMN).

The terminal devices 110 may be any terminal device, including, but not limited to, a terminal device having a wired or wireless connection with the network device 120 or any other terminal device.

For example, the terminal device may refer to an access terminal, a User Equipment (UE), a user unit, a user station, a mobile station, a remote station, a remote terminal, a mobile device, a user terminal, a terminal, a wireless communication device, a user agent, or a user device. The terminal device may be a cellular phone, a cordless phone, a Session Initiation Protocol (SIP) phone, a Wireless Local Loop (WLL) station, a Personal Digital Assistant (PDA), a handheld device or a computing device having a wireless communication function, another processing device connected to a wireless modem, a vehicle-mounted device, a wearable device, a terminal device in the 5G network, or a terminal device in a future evolved PLMN, etc.

The terminal devices 110 may be used for Device to Device (D2D) communication.

The wireless communication system 100 may further include a core network device 130 that communicates with the base station. The core network device 130 may be a 5G Core (5GC) device, for example, Access and Mobility Management Function (AMF), Authentication Server Function (AUSF), User Plane Function (UPF), or Session Management Function (SMF). Optionally, the core network device 130 may alternatively be an Evolved Packet Core (EPC) device of the LTE network, for example, a Session Management Function+Core Packet Gateway (SMF+PGW–C) device. It can be appreciated that the SMF+PGW–C can implement the functions of both SMF and PGW–C. With the network evolution, the above core network device may have other names, or a new network entity may be formed due to division of the functions of the core network, and the embodiment of the present disclosure is not limited to any of these examples.

Communications between the functional units in the communication system 100 may be implemented by establishing connections via Next Generation (NG) interfaces.

For example, the terminal device can establish an air interface connection with an access network device via an NR interface to transmit user plane data and control plane signaling. The terminal device can establish a control plane signaling connection with an AMF via an NG interface 1 (N1). The access network device, such as a next generation radio access base station (gNB), can establish a user plane data connection with a UPF via an NG interface 3 (N3). The access network device can establish a control plane signaling connection with the AMF via an NG interface 2 (N2). The UPF can establish a control plane signaling connection with an SMF via an NG interface 4 (N4). The UPF can exchange user plane data with a data network via an NG interface 6 (N6). The AMF can establish a control plane signaling connection with the SMF via an NG interface 11 (N11). The SMF can establish a control plane signaling connection with a PCF via an NG interface 7 (N7).

FIG. 1 exemplarily shows one base station, one core network device, and two terminal devices. Optionally, the communication system 100 may include multiple base station devices, and the coverage of each base station device may include other numbers of terminal devices. The embodiment of the present disclosure is not limited to this.

It can be appreciated that, in the embodiments of the present disclosure, a device having a communication function in a network/system may be referred to as a communication device. Taking the communication system 100 shown in FIG. 1 as an example, the communication devices may include the network device 120 and the terminal devices 110 with communication functions. The network device 120 and the terminal devices 110 may be the devices described above, and details thereof will be omitted here. The communication devices may also include other devices in the communication system 100, e.g., other network entities such as a network controller, an MME, etc., and the embodiment of the present disclosure is not limited to any of these examples.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

FIG. 2 is a schematic block diagram of a system framework 200 according to an embodiment of the present disclosure.

As shown in FIG. 2, the system framework 200 may include a visited network and a home network.

Here, the visited network may include a terminal device, an access network device, an Access and Mobility Management Function (AMF), a Visit Session Management Function (V-SMF), and a User Plane Function (UPF). The visited network may be a Stand-alone Non-Public Network (SNPN).

The home network may include a Unified Data Management (UDM)/Home Subscriber Server (HSS), a Home Session Management Function (H-SMF), a User Plane Function (UPF), a Home Policy Control function (H-PCF), a Proxy Call Session Control Function (P-CSCF), a Serving Call Session Control Function (S-CSCF), Technology-Associated RFS (TAS), an Interconnection Border Control Function (IBCF)/Border Gateway Control Function (BGCF)/Media Gateway Control Function (MGCF)+Media Plane Function, Part B.

For example, the UDM/HSS can be connected to the TAS via an Sh interface, the TAS can be connected to the S-CSCF via an ISC interface, the UDM/HSS can be connected to the S-CSCF via a Cx interface, the H-PCF can be connected to the P-CSCF via an Rx or N5 interface CSCF, the P-CSCF can be connected to the S-CSCF via an Mw, the UOF of the home network can be connected to Interconnect Border Control Function (IBCF)/Border Gateway Control Function (BGCF)/Media Gateway Control Function (MGCF)+Media Plane Function via an N6 interface. In addition, in the system 200, the control plane may be a dashed line passing through the P-CSCF and the S-CSCF as shown in FIG. 2, and the media plane may be a dashed line that does not pass through the P-CSCF and the S-CSCF.

FIG. 3 shows a schematic flowchart illustrating a wireless communication method 210 according to an embodiment of the present disclosure. The method 210 may be performed by a terminal device, e.g., the terminal device shown in FIG. 1.

As shown in FIG. 3, the method 210 may include:

At S211, a terminal device receives first indication information indicating that the terminal device and a first PLMN are capable of interworking with each other.

With the first indication information, the terminal device and the first PLMN can interwork with each other. That is, with the first indication information, the terminal device can access an IMS in the first PLMN. It is possible to not only enable the terminal device in an NPN to be connected to the IMS, but also avoid separate deployment of the IMS in the NPN, such that the network deployment cost and system complexity can be reduced.

In some embodiments of the present disclosure, S211 may include:

> receiving, by the terminal device, the first indication information transmitted by an NPN Access and Mobility Management Function (AMF) in an NPN registration process.

In some embodiments of the present disclosure, S211 may include:

> receiving, by the terminal device, a Radio Resource Control (RRC) connection release message transmitted by a Non-Public Network (NPN) access network device, the RRC connection release message including the first indication information, and the RRC connection release message indicating release of an RRC connection between the terminal device and the NPN access network device.

In some embodiments of the present disclosure, the RRC connection release message may further include second indication information indicating information on the first PLMN. Optionally, the first PLMN may be an identifier of the first PLMN.

In some embodiments of the present disclosure, the method 210 may further include: initiating, by the terminal device, a registration process in the first PLMN; and initiating, by the terminal device, a PDU session transfer process to transfer a PDU session established in a Non-Public Network (NPN) based on a second PLMN to the first PLMN, the first PLMN and the second PLMN being same or different.

With the PDU session transfer process, the AMF in the first PLMN can select a second SMF. Thus, the SMF can be maintained unchanged, and then the IP address can be maintained unchanged. The second SMF may be an SMF in the second PLMN.

In some embodiments of the present disclosure, the method 210 may further include:

> transmitting, by the terminal device, an uplink Non-Access Stratum (NAS) transport message to a first Access and Mobility Management Function (AMF), the uplink NAS transport message including Request Type information indicating that the terminal device has established a PDU session in an NPN, and the first AMF being an AMF in the first PLMN.

In other words, with the Request Type information, the AMF in the first PLMN can select a second SMF. Thus, the SMF can be maintained unchanged, and then the IP address can be maintained unchanged. The second SMF may be an SMF in the second PLMN.

In some embodiments of the present disclosure, the PDU session may be used for a Quality of Service (QoS) flow of a voice service in an Internet Protocol (IP) Multimedia System (IMS), for example, a QoS flow with a 5G QoS Identifier (5QI)=1.

Figure 4:
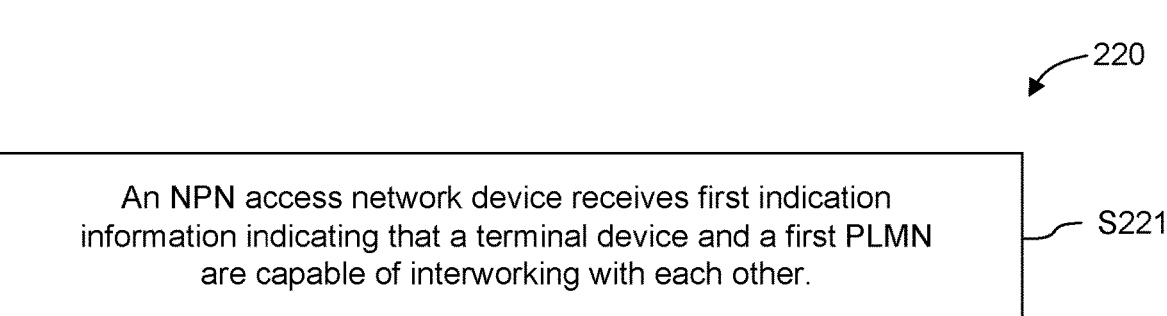

FIG. 4 shows a schematic flowchart illustrating a wireless communication method 220 according to an embodiment of the present disclosure. The method 220 may be performed by an access network device, e.g., the access network device shown in FIG. 1.

As shown in FIG. 4, the method 220 may include:

At S221, a Non-Public Network (NPN) access network device receives first indication information indicating that a terminal device and a first Public Land Mobile Network (PLMN) are capable of interworking with each other.

In some embodiments of the present disclosure, S221 may include:

receiving, by the NPN access network device, the first indication information transmitted by an NPN Access and Mobility Management Function (AMF) in an NPN registration process.

In some embodiments of the present disclosure, S221 may include:

receiving, by the NPN access network device, the first indication information transmitted by an NPN Access and Mobility Management Function (AMF) in a process of establishing a Protocol Data Unit (PDU) session in the NPN based on a second PLMN, the first PLMN and the second PLMN being same or different.

In some embodiments of the present disclosure, the PDU session may be used for a Quality of Service (QoS) flow of a voice service in an Internet Protocol (IP) Multimedia System (IMS).

In some embodiments of the present disclosure, the method 220 may further include:

transmitting, by the NPN access network device, a Radio Resource Control (RRC) connection release message to the terminal device, the RRC connection release message including the first indication information, and the RRC connection release message indicating release of an RRC connection between the terminal device and the NPN access network device.

In some embodiments of the present disclosure, the RRC connection release message may further include second indication information indicating information on the first PLMN.

In some embodiments of the present disclosure, the method 220 may further include:

transmitting, by the NPN access network device, third indication information to a second Session Management Function (SMF), the third indication information indicating triggering of a process of redirection to the first PLMN, the second SMF being in an SMF in a second PLMN, the first PLMN and the second PLMN being same or different.

For example, the NPN access network device may transmit a rejection message to the second SMF. The rejection message indicates rejection to establish a Quality of Service (QoS) flow for a voice service in an Internet Protocol (IP) Multimedia Service System (IMS). The rejection message includes the third indication information.

Figure 5:
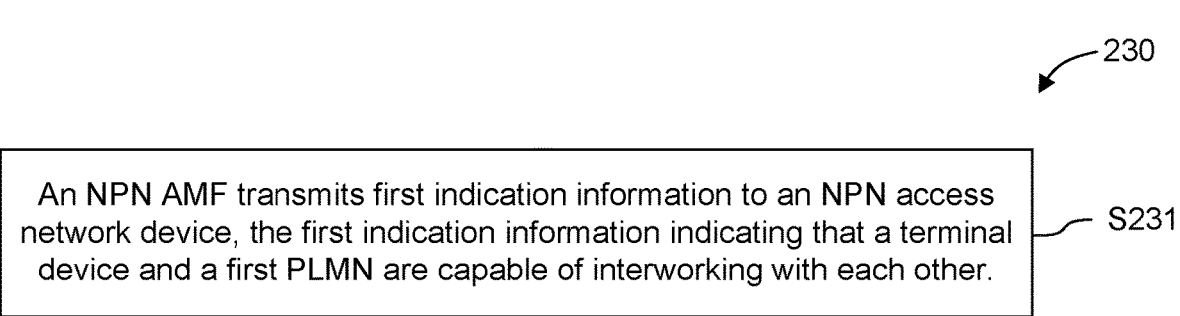

FIG. 5 shows a schematic flowchart illustrating a wireless communication method 230 according to an embodiment of the present disclosure. The method 230 may be performed by a core network device, e.g., the core network device shown in FIG. 1. For example, the core network device may be an NPN AMF or a device having an AMF.

As shown in FIG. 5, the method 230 may include:

At S231, a Non-Public Network (NPN) Access and Mobility Management Function (AMF) transmits first indication information to an NPN access network device, the first indication information indicating that a terminal device and a first Public Land Mobile Network (PLMN) are capable of interworking with each other.

In some embodiments of the present disclosure, S231 may include:

transmitting, by the NPN AMF, the first indication information to each of the terminal device and the NPN access network device in an NPN registration process.

In some embodiments of the present disclosure, S231 may include:

transmitting, by the NPN AMF, the first indication information to the NPN access network device in a process of establishing a Protocol Data Unit (PDU) session in the NPN based on a second PLMN, the first PLMN and the second PLMN being same or different.

Figure 6:
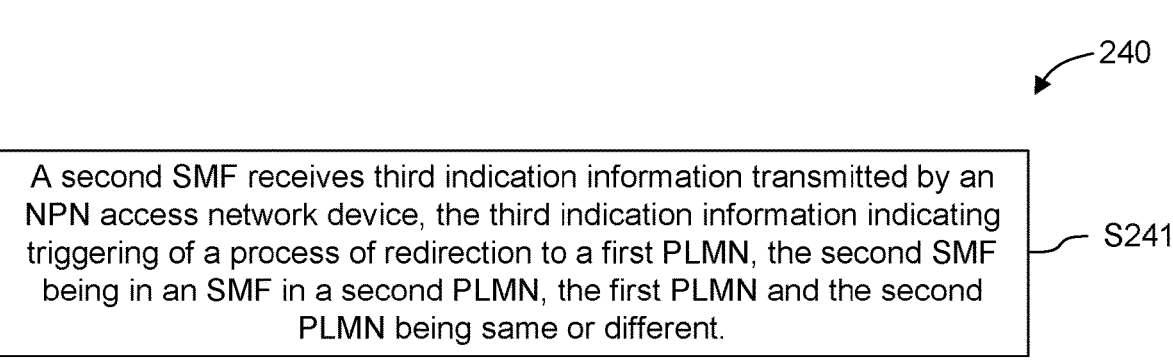

FIG. 6 shows a schematic flowchart illustrating a wireless communication method 240 according to an embodiment of the present disclosure. The method 240 may be performed by a core network device, e.g., the core network device shown in FIG. 1. For example, the core network device may be an SMF or a device having an SMF.

As shown in FIG. 6, the method 240 may include:

At S241, a second Session Management Function (SMF) receives third indication information transmitted by a Non-Public Network (NPN) access network device, the third indication information indicating triggering of a process of redirection to a first Public Land Mobile Network (PLMN), the second SMF being in an SMF in a second PLMN, the first PLMN and the second PLMN being same or different.

For example, the second SMF may receive a rejection message transmitted by the NPN access network device. The rejection message indicates rejection to establish a Quality of Service (QoS) flow for a voice service in an Internet Protocol (IP) Multimedia Service System (IMS). The rejection message includes the third indication information.

It can be appreciated that for the above methods 210, 220, 230 and 240, reference may be to the corresponding steps, and details thereof will be omitted here for brevity.

Figure 7:
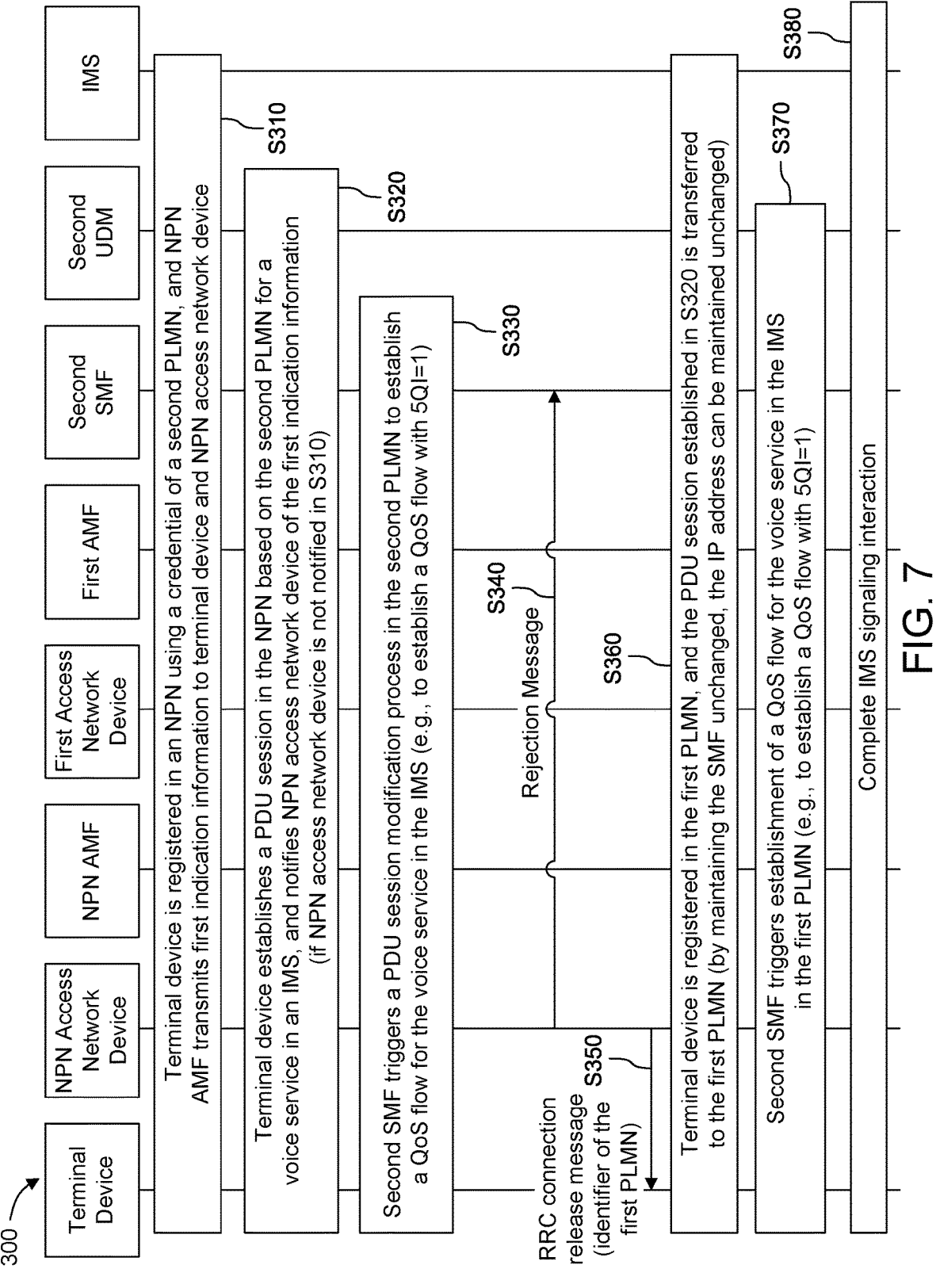

FIG. 7 is a schematic flowchart illustrating a wireless communication method 300 according to an embodiment of the present disclosure.

As shown in FIG. 7, the method 300 may include some or all of the following contents.

At S310, a terminal device is registered in an NPN using a credential of a second PLMN, and an NPN AMF transmits first indication information to the terminal device and an NPN access network device.

For example, the terminal device initiates registration in the NPN, and the credential of the second PLMN is used in the registration process. During the registration process, the AMF needs to notify the terminal device that it can interwork with a first PLMN and notify the NPN access network device that the terminal device and the first PLMN can interwork with each other. Optionally, the first PLMN and the second PLMN may be same or different.

At S320, the terminal device establishes a PDU session in the NPN based on the second PLMN for a voice service in an IMS, and notifies the NPN access network device of the first indication information (if the NPN access network device is not notified in S310).

For example, the terminal device establishes a PDU session in the NPN, and the PDU session is used for the voice service in the IMS. During the establishment process, the AMF needs to select an SMF in the second PLMN for the PDU session. In the PDU session establishment process, if the AMF has not notified the NPN access network device in S310 that the terminal device and the first PLMN can interwork with each other, the AMF will do so in S320.

At S330, the second SMF triggers a PDU session modification process in the second PLMN to establish a QoS flow for the voice service in the IMS (for example, to establish a QoS flow with 5QI=1).

In other words, the second SMF initiates a modification procedure for the PDU session, the purpose of which is to establish a QoS flow for the voice service in the IMS. For example, it may refer to a QoS flow with 5QI=1.

At S340, the NPN access network device transmits a rejection message to the second SMF.

For example, the NPN access network device rejects a request for establishing a QoS flow of the voice service in the IMS, and notifies the second SMF that "a process of redirection to the first PLMN is ongoing".

At S350, the NPN access network device transmits an RRC connection release message (identifier of the first PLMN) to the terminal device.

For example, the NPN access network device triggers an RRC release process, and indicates at least the information on the first PLMN in the RRC release message. Optionally, the information on the first PLMN may be the identifier of the first PLMN.

At S360, the terminal device is registered in the first PLMN, and the PDU session established in S320 is transferred to the first PLMN (by maintaining the SMF unchanged, the IP address can be maintained unchanged).

For example, according to the RRC connection release message, the terminal device can perform PLMN selection, that is, select the first PLMN, initiate a registration process in the first PLMN, and then transfer the PDU session established in S320 to the first PLMN. For example, a Request Type in an uplink non-access stratum transport (UL NAS TRANSPORT) message can be set as Existing PDU Session, and based on this, the AMF in the first PLMN can select the second SMF selected in S320. Therefore, the SMF can be maintained unchanged, and the IP address can be maintained unchanged.

At S370, the second SMF triggers establishment of a QoS flow for the voice service in the IMS in the first PLMN (for example, to establish a QoS flow with 5QI=1).

For example, the second SMF initiates a process of establishing the QoS flow of the voice service in the IMS. For example, it may refer to a QoS flow with 5QI=1.

At S380, the IMS signaling interaction is completed.

Figures 8, 9:
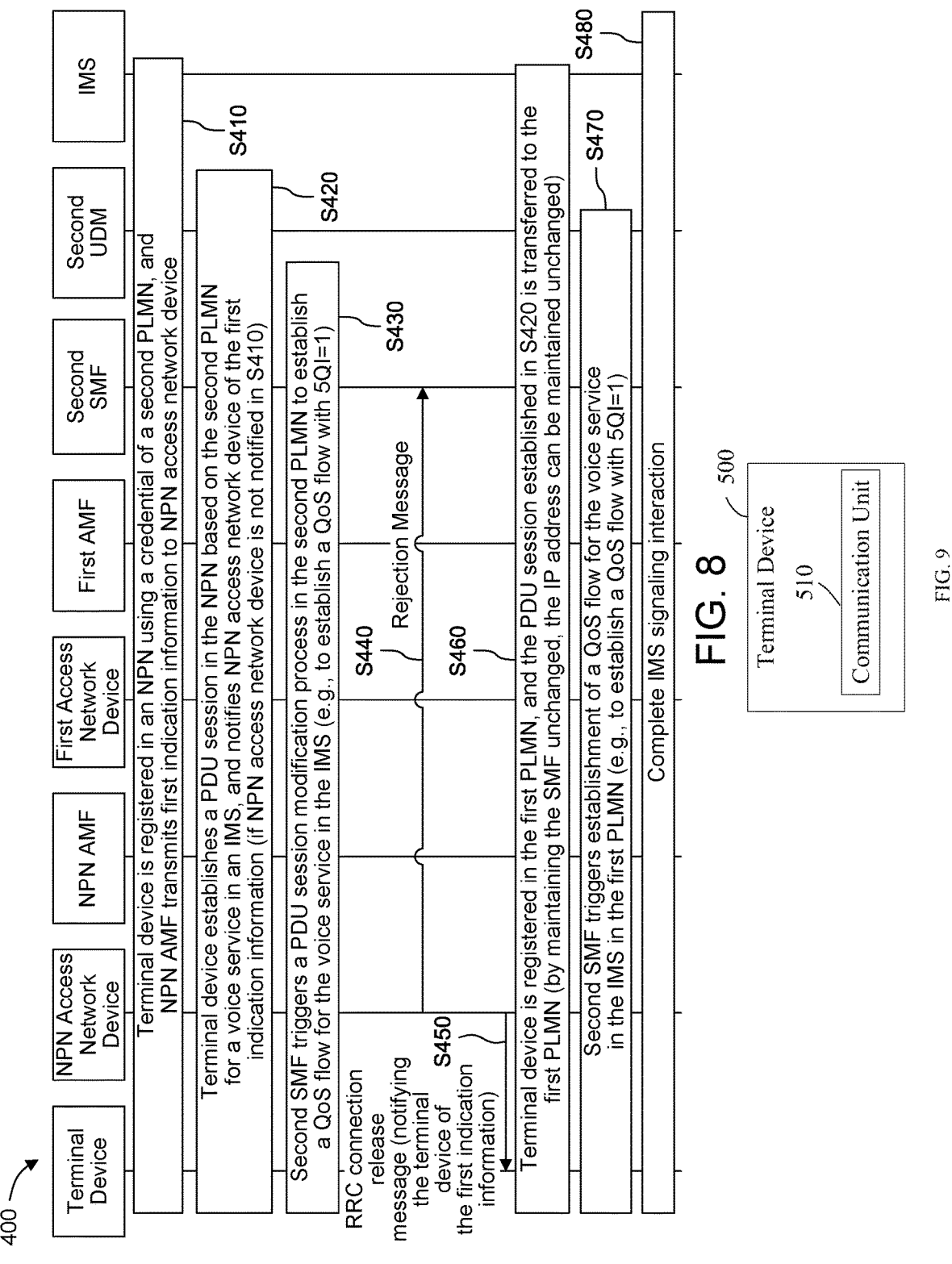
FIG. 9 is a schematic block diagram of a terminal device according to an embodiment of the present disclosure.

FIG. 8 is a schematic flowchart illustrating a wireless communication method 400 according to an embodiment of the present disclosure.

As shown in FIG. 8, the method 400 may include some or all of the following contents.

At S410, a terminal device is registered in an NPN using a credential of a second PLMN, and an NPN AMF transmits first indication information to an NPN access network device.

For example, the terminal device initiates registration in the NPN, and the credential of the second PLMN is used in the registration process. During the registration process, the AMF notifies the NPN access network device that the terminal device and the first PLMN can interwork with each other. Optionally, the first PLMN and the second PLMN may be same or different.

At S420, the terminal device establishes a PDU session in the NPN based on the second PLMN for the voice service in the IMS, and notifies the NPN access network device of the first indication information (if the NPN access network device is not notified in S410).

For example, the terminal device establishes a PDU session in the NPN, and the PDU session is used for a voice service in an IMS. In the establishment process, the AMF needs to select an SMF in the second PLMN for the PDU session. In the PDU session establishment process, if the AMF has not notified the NPN access network device in S410 that the terminal device and the first PLMN can interwork with each other, the AMF will do so in S420.

At S430, the second SMF triggers a PDU session modification process in the second PLMN to establish a QoS flow for the voice service in the IMS (for example, to establish a QoS flow with 5QI=1).

In other words, the second SMF initiates a modification procedure for the PDU session, the purpose of which is to establish a QoS flow for the voice service in the IMS. For example, it may refer to a QoS flow with 5QI=1.

At S440, the NPN access network device transmits a rejection message to the second SMF.

For example, the NPN access network device rejects a request for establishing a QoS flow of the voice service in the IMS, and notifies the second SMF that "a process of redirection to the first PLMN is ongoing".

At S450, an RRC connection release message (notifying the terminal device of the first indication information).

For example, the NPN access network device triggers an RRC release process, and indicates at least the information on the first PLMN in the RRC release message, notifying the terminal device in the RRC release message that the terminal device and the first PLMN can interwork with each other. Optionally, the information on the first PLMN may be an identifier of the first PLMN.

At S460, the terminal device is registered in the first PLMN, and the PDU session established in S420 is transferred to the first PLMN (by maintaining the SMF unchanged, the IP address can be maintained unchanged).

For example, according to the RRC connection release message, the terminal device can perform PLMN selection, that is, select the first PLMN, initiate a registration process in the first PLMN, and then transfer the PDU session established in S420 to the first PLMN. For example, a Request Type in an uplink non-access stratum transport (UL NAS TRANSPORT) message can be set as Existing PDU Session, and based on this, the AMF in the first PLMN can select the second SMF selected in S420. Therefore, the SMF can be maintained unchanged, and the IP address can be maintained unchanged.

At S470, the second SMF triggers establishment of a QoS flow for the voice service in the IMS in the first PLMN (for example, to establish a QoS flow with 5QI=1).

For example, the second SMF initiates a process of establishing the QoS flow of the voice service in the IMS. For example, it may refer to a QoS flow with 5QI=1.

At S480, the IMS signaling interaction is completed.

The preferred embodiments of the present disclosure have been described in detail above with reference to the accompanying drawings. However, the present disclosure is not limited to the specific details of the above embodiments. Various simple modifications can be made to the technical solutions of the present disclosure without departing from the scope of the technical concept of the present disclosure. These simple modifications all belong to the protection scope of the present disclosure. For example, the specific technical features described in the above specific embodiments can be combined as appropriate provided that they do not conflict. In order to avoid unnecessary repetition, the description of various possible combinations will be omitted here. In another example, the embodiments of the present disclosure can also be combined as appropriate, as long as they do not violate the concept of the present disclosure, and they should also be regarded as the content disclosed in the present disclosure.

It should also be understood that, in the method embodiments of the present disclosure, the values of the sequence numbers of the above processes do not mean the order of execution, and the execution order of each process should be determined by its functions and internal logics, and the implementation of the present disclosure is not limited to any specific order. In addition, in the embodiments of the present disclosure, the terms "downlink" and "uplink" are used to indicate the transmission direction of signals or data. Here, "downlink" is used to indicate that the transmission direction of signals or data is a first direction from a station to a user equipment of a cell, and "uplink" is used to indicate that the transmission direction of signals or data is a second direction from a user equipment in a cell to a station. For example, a "downlink signal" indicates that the transmission direction of the signal is the first direction. In addition, in this embodiment of the present disclosure, the term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

The method embodiments of the present disclosure have been described in detail above with reference to FIGS. 1 to 8, and the apparatus embodiments of the present disclosure will be described in detail below with reference to FIGS. 9 to 13.

FIG. 9 is a schematic block diagram of a terminal device 500 according to an embodiment of the present disclosure.

As shown in FIG. 9, the terminal device 500 may include:

a communication unit 510 configured to receive first indication information indicating that the terminal device and a first Public Land Mobile Network (PLMN) are capable of interworking with each other.

In some embodiments of the present disclosure, the communication unit 510 may be configured to:

receive the first indication information transmitted by a Non-Public Network (NPN) Access and Mobility Management Function (AMF) in an NPN registration process.

In some embodiments of the present disclosure, the communication unit 510 may be configured to:

receive a Radio Resource Control (RRC) connection release message transmitted by a Non-Public Network (NPN) access network device, the RRC connection release message including the first indication information, and the RRC connection release message indicating release of an RRC connection between the terminal device and the NPN access network device.

In some embodiments of the present disclosure, the RRC connection release message may further include second indication information indicating information on the first PLMN.

In some embodiments of the present disclosure, the communication unit 510 may be further configured to:

initiate a registration process in the first PLMN; and initiate a PDU session transfer process to transfer a PDU session established in a Non-Public Network (NPN) based on a second PLMN to the first PLMN, the first PLMN and the second PLMN being same or different.

In some embodiments of the present disclosure, the communication unit 510 may be further configured to:

transmit an uplink Non-Access Stratum (NAS) transport message to a first Access and Mobility Management Function (AMF), the uplink NAS transport message including Request Type information indicating that the terminal device has established a PDU session in an NPN, and the first AMF being an AMF in the first PLMN.

In some embodiments of the present disclosure, the PDU session may be used for a Quality of Service (QoS) flow of a voice service in an Internet Protocol (IP) Multimedia System (IMS).

Figures 10, 11, 12, 13:
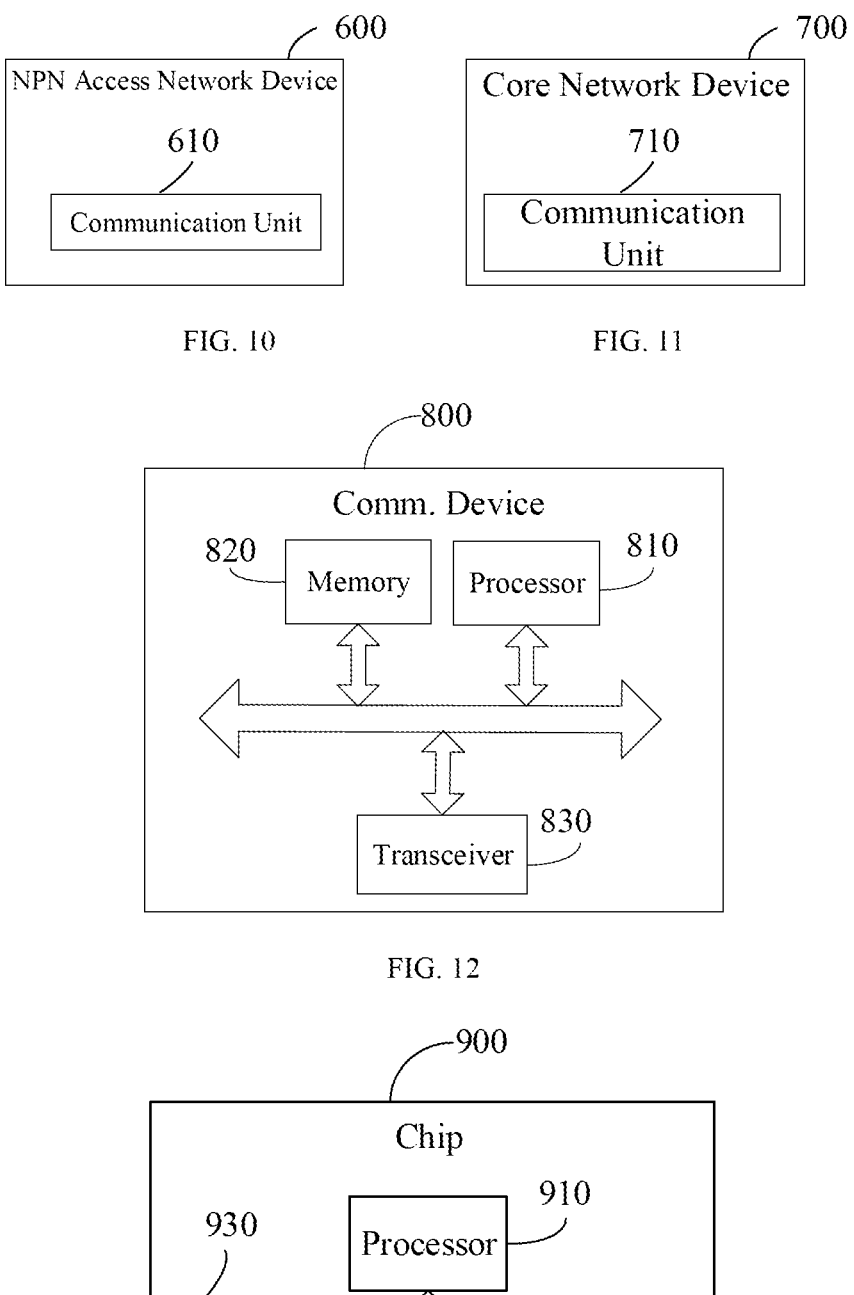
FIG. 10 is a schematic block diagram of an NPN access network device according to an embodiment of the present disclosure.
FIG. 11 is a schematic block diagram of a core network device according to an embodiment of the present disclosure.
FIG. 12 is a schematic block diagram of a communication device according to an embodiment of the present disclosure.
FIG. 13 is a schematic block diagram of a chip according to an embodiment of the present disclosure.

FIG. 10 is a schematic block diagram of an NPN access network device 600 according to an embodiment of the present disclosure.

As shown in FIG. 10, the NPN access network device 600 may include:

a communication unit 610 configured to receive first indication information indicating that a terminal device and a first Public Land Mobile Network (PLMN) are capable of interworking with each other.

In some embodiments of the present disclosure, the communication unit may be configured to:

receive the first indication information transmitted by an NPN Access and Mobility Management Function (AMF) in an NPN registration process.

In some embodiments of the present disclosure, the communication unit 610 may be configured to:

receive the first indication information transmitted by an NPN Access and Mobility Management Function (AMF) in a process of establishing a Protocol Data Unit (PDU) session in the NPN based on a second PLMN, the first PLMN and the second PLMN being same or different.

In some embodiments of the present disclosure, the PDU session may be used for a Quality of Service (QoS) flow of a voice service in an Internet Protocol (IP) Multimedia System (IMS).

In some embodiments of the present disclosure, the communication unit 610 may be further configured to:

transmit a Radio Resource Control (RRC) connection release message to the terminal device, the RRC connection release message including the first indication information, and the RRC connection release message indicating release of an RRC connection between the terminal device and the NPN access network device.

In some embodiments of the present disclosure, the RRC connection release message may further include second indication information indicating information on the first PLMN.

In some embodiments of the present disclosure, the communication unit 610 may be further configured to:

transmit third indication information to a second Session Management Function (SMF), the third indication information indicating triggering of a process of redirection to the first PLMN, the second SMF being in an SMF in a second PLMN, the first PLMN and the second PLMN being same or different.

In some embodiments of the present disclosure, the communication unit 610 may be configured to:

transmit a rejection message to the second SMF, the rejection message indicating rejection to establish a Quality of Service (QoS) flow for a voice service in an Internet Protocol (IP) Multimedia Service System (IMS), and the rejection message including the third indication information.

FIG. 11 is a schematic block diagram of a core network device 700 according to an embodiment of the present disclosure.

In some embodiments of the present disclosure, the core network device 700 may be an NPN AMF or a device having an AMF.

As shown in FIG. 11, the core network device 700 may include:

a communication unit 710 configured to transmit first indication information to a Non-Public Network (NPN) access network device, the first indication information indicating that a terminal device and a first Public Land Mobile Network (PLMN) are capable of interworking with each other.

In some embodiments of the present disclosure, the communication unit 710 may be configured to:

transmit the first indication information to each of the terminal device and the NPN access network device in an NPN registration process.

In some embodiments of the present disclosure, the communication unit 710 may be configured to:

transmit the first indication information to the NPN access network device in a process of establishing a Protocol Data Unit (PDU) session in the NPN based on a second PLMN, the first PLMN and the second PLMN being same or different.

In some embodiments of the present disclosure, the core network device 700 may be an NPN SMF or a device having an SMF.

As shown in FIG. 11, the core network device 700 may include:

a communication unit 710 configured to receive third indication information transmitted by a Non-Public Network (NPN) access network device, the third indication information indicating triggering of a process of redirection to a first Public Land Mobile Network (PLMN), the second SMF being in an SMF in a second PLMN, the first PLMN and the second PLMN being same or different.

In some embodiments of the present disclosure, the communication unit 710 may be configured to:

receive a rejection message transmitted by the NPN access network device, the rejection message indicating rejection to establish a Quality of Service (QoS) flow for a voice service in an Internet Protocol (IP) Multimedia Service System (IMS), and the rejection message including the third indication information.

It should be understood that the apparatus embodiments and the method embodiments may correspond to each other, and for similar descriptions, reference can be made to the method embodiments. For brevity, details thereof will be omitted here.

The communication device according to the embodiment of the present disclosure has been described above from the perspective of functional modules with reference to the accompanying drawings. It should be understood that the functional modules can be implemented in the form of hardware, software instructions, or a combination of hardware and software modules.

Specifically, the steps of the method embodiments in the embodiments of the present disclosure may be implemented by hardware integrated logic circuits in the processor and/or software instructions, and the steps of the methods disclosed in conjunction with the embodiments of the present disclosure may be directly embodied as implemented by a hardware decoding processor or a combination of hardware and software modules in a decoding processor.

Optionally, the software modules may be located in a random access memory, a flash memory, a read-only memory, a programmable read-only memory, an electrically erasable programmable memory, a register, and other storage media known in the art. The storage medium is located in the memory, and the processor reads the information in the memory, and performs the steps in the above method embodiments in combination with its hardware.

For example, the communication unit above may be implemented by a transceiver.

FIG. 12 is a schematic diagram showing a structure of a communication device 800 according to an embodiment of the present disclosure.

As shown in FIG. 12, the communication device 800 includes a processor 810.

Here, the processor 810 can invoke and execute a computer program from a memory to implement the method in the embodiment of the present disclosure.

Referring to FIG. 12 again, the communication device 800 may further include a memory 820.

Here, the memory 820 may be configured to store indication information, and may further be configured to store codes, instructions, etc. to be executed by the processor 810. The processor 810 can invoke and execute a computer program from the memory 820 to implement the method in the embodiment of the present disclosure. The memory 820 may be a separate device independent from the processor 810, or may be integrated in the processor 810.

Referring to FIG. 12 again, the communication device 800 may further include a transceiver 830.

Here, the processor 810 may control the transceiver 830 to communicate with other devices, and in particular, transmit information or data to other devices, or receive information or data transmitted by other devices.

The transceiver 830 may include a transmitter and a receiver. The transceiver 830 may further include one or more antennas.

It can be appreciated that the components in the communication device 800 may be connected via a bus system. Here, the bus system may include a power bus, a control bus and a status signal bus, in addition to a data bus.

It can be appreciated that the communication device 800 may be the terminal device according to the embodiment of the present disclosure, and the communication device 800 may implement the corresponding processes implemented by the terminal device in any of the methods according to the embodiments of the present disclosure. That is, the communication device 800 in the embodiment of the present disclosure may correspond to the terminal device 500 in the embodiment of the present disclosure, and may correspond to the corresponding entity that performs the method according to the embodiment of the present disclosure. For the sake of brevity, details thereof will be omitted here. Similarly, the communication device 800 may be the NPN access network device 600 or the core network device 700 according to the embodiment of the present disclosure, and correspond to the corresponding entity that performs the method according to the embodiment of the present disclosure. For the sake of brevity, details thereof will be omitted here.

In addition, an embodiment of the present disclosure also provides a chip.

For example, the chip may be an integrated circuit chip, which has a signal processing capability, and can implement or perform any of the methods, steps, and logic block diagrams disclosed in the embodiments of the present disclosure. The chip may also be referred to as a system level chip, a system chip, a chip system, a system-on-a-chip, or the like. Optionally, the chip can be applied in various communication devices, such that the communication device installed with the chip can perform the methods, steps and logic block diagrams disclosed in the embodiments of the present disclosure.

FIG. 13 is a schematic diagram showing a structure of a chip 900 according to an embodiment of the present disclosure.

As shown in FIG. 13, the chip 900 includes a processor 910.

Here, the processor 910 can invoke and execute a computer program from a memory to implement the method in the embodiment of the present disclosure.

Referring to FIG. 13 again, the chip 900 may further include a memory 620.

Here, the processor 910 can invoke and execute a computer program from the memory 920 to implement the method in the embodiment of the present disclosure. The memory 920 may be configured to store indication information, and may further be configured to store codes, instructions, etc. to be executed by the processor 910. The memory 920 may be a separate device independent from the processor 910, or may be integrated in the processor 910.

Referring to FIG. 13 again, the chip 900 may further include an input interface 630.

Here, the processor 910 can control the input interface 930 to communicate with other devices or chips, and in particular, obtain information or data transmitted by other devices or chips.

Referring to FIG. 13 again, the chip 900 may further include an output interface 940.

Here, the processor 910 can control the output interface 940 to communicate with other devices or chips, and in particular, output information or data to other devices or chips.

It can be appreciated that the chip 900 may be applied in the access network device according to the embodiment of the present disclosure, and the chip 900 may implement the corresponding processes implemented by the access network device in any of the methods according to the embodiments of the present disclosure, or the corresponding processes implemented by the terminal device or the core network device in any of the methods according to the embodiments of the present disclosure. For the sake of brevity, details thereof will be omitted here.

It can be appreciated that the components in the chip 900 may be connected via a bus system. Here, the bus system may include a power bus, a control bus and a status signal bus, in addition to a data bus.

The above processor may include, but not limited to, a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed by the processor. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, erasable programmable memory, or register. The storage medium can be located in the memory, and the processor can read information from the memory and perform the steps of the above methods in combination with its hardware.

The above memory may include, but not limited to, a volatile memory and/or a non-volatile memory. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM).

It is to be noted that the memory used for the system and method described in the present disclosure is intended to include these and any other suitable types of memories.

An embodiment of the present disclosure also provides a computer readable storage medium for storing a computer program. The computer readable storage medium stores one or more programs including instructions which, when executed by a portable electronic device including a plurality of application programs, enable the portable electronic device to perform the method according to any of the method embodiments.

Optionally, the computer readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program product including a computer program.

Optionally, the computer program product can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer program product can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program which, when executed by a computer, causes the computer to perform the method according to any of the method embodiments.

Optionally, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

In addition, an embodiment of the present disclosure further provides a communication system, which may include the above terminal device and network device to form the communication system 100 as shown in FIG. 1. Details thereof will be omitted here for simplicity. It should be noted that the term "system" and the like as used herein may also be referred to as "network management architecture" or "network system" or the like.

It should also be understood that the terms used in the embodiments of the present disclosure and the claims as attached are only for the purpose of describing specific embodiments, and are not intended to limit the embodiments of the present disclosure.

For example, as used in the embodiments of the present disclosure and the claims as attached, the singular forms "a," "the," "above," and "said" are intended to include the plural forms as well, unless the context clearly indicates otherwise.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of the embodiments of the present disclosure.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways.

For example, the divisions of the units or modules or components in the apparatus embodiments as described above are only divisions based on logical functions, and there may be other divisions in actual implementations. For example, more than one unit or module or component may be combined or integrated into another system, or some units or modules or components can be ignored or omitted.

In another example, the units/modules/components described above as separate/explicit components may or may not be physically separated, that is, they may be co-located or distributed across a number of network elements. Some or all of the units/modules/components may be selected according to actual needs to achieve the objects of the embodiments of the present disclosure.

Finally, it is to be noted that the mutual coupling or direct coupling or communicative connection as shown or discussed above may be indirect coupling or communicative connection between devices or units via some interfaces which may be electrical, mechanical, or in any other forms.

While the specific embodiments of the present disclosure have been described above, the scope of the embodiments of the present disclosure is not limited to these embodiments. Various variants and alternatives can be made by those skilled in the art without departing from the scope of the embodiments of the present disclosure. These variants and alternatives are to be encompassed by the scope of the embodiments of present disclosure as defined by the claims as attached.

What is claimed is:

1. A wireless communication method, comprising:
establishing, by a user equipment (UE), a packet data unit (PDU) session in a non-public network (NPN) using a second public land mobile network (PLMN), wherein the UE is registered in the NPN using a credential of the second PLMN;
receiving, by the UE from a base station of the NPN, a radio resource control (RRC) connection release message, wherein the RRC connection release message includes a first indication information indicating that the UE and a first PLMN are capable of interworking with each other, and wherein the RRC connection release message indicates a release of an RRC connection between the UE and the base station; and
transmitting, by the UE and based on the RRC connection release message, a request to a core network device of the first PLMN to establish the PDU session in the first PLMN as an existing session,
wherein the first PLMN is different than the second PLMN.

2. The method according to claim 1, wherein the first indication information is received from an NPN access and mobility management function (AMF) in an NPN registration process.

3. The method according to claim 1, wherein the RRC connection release message further includes a second indication information used to identify the first PLMN.

4. The method according to claim 1, further comprising:
transmitting, by the UE, an uplink non-access stratum (NAS) transport message to a first access and mobility management function (AMF), wherein the uplink NAS transport message includes request type information that indicates that the UE has established the PDU session in the NPN, and the first AMF is in the first PLMN.

5. The method according to claim 1, wherein the PDU session is used for a quality of service (QoS) flow of a voice service in an Internet Protocol (IP) Multimedia System (IMS).

6. The method according to claim 5, wherein a rejection of an establishment of the QoS flow triggers a migration of the PDU session.

7. A user equipment (UE) configured for wireless communication, the UE comprising:

a transmitter; and a receiver;

wherein:

the transmitter and receiver are collectively configured to establish a packet data unit (PDU) session in a non-public network (NPN) using a second public land mobile network (PLMN), wherein the UE is registered in the NPN using a credential of the second PLMN;

the receiver is configured to receive, from a base station of the NPN, a radio resource control (RRC) connection release message, wherein the RRC connection release message includes a first indication information indicating that the UE and a first PLMN are capable of interworking with each other, and wherein the RRC connection release message indicates a release of an RRC connection between the UE and the base station; and the transmitter is configured to transmit, based on the RRC connection release message, a request to a core network device of the first PLMN to establish the PDU session in the first PLMN as an existing session, wherein the first PLMN is different than the second PLMN.

8. The UE according to claim 7, wherein the first indication information is received from an NPN access and mobility management function (AMF) in an NPN registration process.

9. The UE according to claim 7, wherein the RRC connection release message further includes a second indication information used to identify the first PLMN.

10. The UE according to claim 7, wherein the transmitter is further configured to:

transmit an uplink non-access stratum (NAS) transport message to a first access and mobility management function (AMF), wherein the uplink NAS transport message includes request type information that indicates that the UE has established the PDU session in the NPN, wherein the first AMF is in the first PLMN.

11. The UE according to claim 7, wherein the PDU session is used for a quality of service (QoS) flow of a voice service in an Internet Protocol (IP) Multimedia System (IMS).

12. The UE of claim 11, wherein a rejection of an establishment of the QoS flow triggers a migration of the PDU session.

13. A base station in a wireless communication system, the base station comprising:

a transmitter; and a receiver;

wherein:

the receiver is configured to receive, from a first core network device, a first indication information indicating that a user equipment (UE) and a first public land mobile network (PLMN) are capable of interworking with each other, wherein the UE has established a packet data unit (PDU) session in a non-public network (NPN) using a second PLMN, wherein the UE is registered in the NPN using a credential of the second PLMN; and the transmitter is configured to transmit, to the UE, a radio resource control (RRC) connection release message, wherein the RRC connection release message includes the first indication information, and wherein the RRC connection release message indicates a release of an RRC connection between the UE and the base station, wherein the first PLMN is different than the second PLMN.

14. The base station according to claim 13, wherein the first core network device is an NPN access and mobility management function (AMF) and the first indication information is received in an NPN registration process.

15. The base station according to claim 13, wherein the RRC connection release message further includes a second indication information used to identify the first PLMN.

16. The base station according to claim 13, wherein the PDU session is used for a quality of service (QoS) flow of a voice service in an Internet Protocol (IP) Multimedia System (IMS).

17. The base station according to claim 16, further comprising a second transmitter configured to transmit a rejection of an establishment of the QoS flow to a second core network device of the second PLMN.

* * * * *